US008339899B2

(12) United States Patent
Boucard

(10) Patent No.: US 8,339,899 B2
(45) Date of Patent: Dec. 25, 2012

(54) SEISMIC DATA ACQUISITION SYSTEM COMPRISING MODULES ASSOCIATED WITH UNITS CONNECTED TO SENSORS, THE MODULES BEING AUTONOMOUS WITH RESPECT TO POWER SUPPLY, SYNCHRONISATION AND STORAGE

(75) Inventor: Daniel Boucard, Thouare sur Loire (FR)

(73) Assignee: Sercel, Carquefou (FR)

( * ) Notice: Subject to any disclaimer, the term of this patent is extended or adjusted under 35 U.S.C. 154(b) by 393 days.

(21) Appl. No.: 12/626,182

(22) Filed: Nov. 25, 2009

(65) Prior Publication Data
US 2010/0128564 A1    May 27, 2010

(30) Foreign Application Priority Data
Nov. 25, 2008  (FR) ..................... 08 06600

(51) Int. Cl.
*G01V 1/22*  (2006.01)
*G01V 1/24*  (2006.01)
(52) U.S. Cl. ................ 367/76; 367/58; 367/63
(58) Field of Classification Search .............. 367/58, 367/59, 60, 63, 76, 77
See application file for complete search history.

(56) References Cited

U.S. PATENT DOCUMENTS

| | | | | |
|---|---|---|---|---|
| 5,627,798 A * | 5/1997 | Siems et al. | ...... | 367/76 |
| 5,724,241 A | 3/1998 | Wood et al. | | |
| 6,070,129 A * | 5/2000 | Grouffal et al. | ...... | 702/32 |
| 6,672,422 B2 * | 1/2004 | Orban et al. | ...... | 181/108 |
| 2003/0016587 A1 | 1/2003 | Wilson et al. | | |
| 2005/0114033 A1 | 5/2005 | Ray et al. | | |
| 2007/0177459 A1 * | 8/2007 | Behn et al. | ...... | 367/76 |
| 2010/0074055 A1 * | 3/2010 | Nemeth et al. | ...... | 367/77 |

FOREIGN PATENT DOCUMENTS
DE    19519164    12/1995

OTHER PUBLICATIONS

French Search Report received in FR 08/06600, mailed Jul. 24, 2009, 2 pages.

* cited by examiner

*Primary Examiner* — Ian Lobo
(74) *Attorney, Agent, or Firm* — Pauly, Devries, Smith & Deffner, L.L.C.

(57) ABSTRACT

Described herein is a land seismic data acquisition system comprising a central processing unit; a cabled network connected to the central processing unit comprising a plurality of acquisition lines each comprising: electronic units assembled in series along a telemetry cable and each associated with at least one seismic sensor, the units processing signals transmitted by the sensor(s); intermediate modules assembled in series along the telemetry cable and each associated with at least one of the electronic units, each intermediate module providing power supply and synchronization of the electronic unit(s) wherewith it is associated; wherein each electronic unit is associated with at least two intermediate modules including at least one upstream and at least one downstream from the electronic unit along the telemetry cable, and comprises synchronization means independent from the cabled network, bidirectional and autonomous power supply means, bidirectional storage means of the signals processed by the electronic units.

11 Claims, 4 Drawing Sheets

SEISMIC DATA ACQUISITION SYSTEM COMPRISING MODULES ASSOCIATED WITH UNITS CONNECTED TO SENSORS, THE MODULES BEING AUTONOMOUS WITH RESPECT TO POWER SUPPLY, SYNCHRONISATION AND STORAGE

CROSS-REFERENCE TO RELATED APPLICATIONS

This application claims the benefit of French Patent Application No. FR 08/06600, filed on Nov. 25, 2008, which application is hereby incorporated by reference in its entirety.

BACKGROUND OF THE INVENTION

1. Field of the Invention

The field of the invention is that of seismic data acquisition. More specifically, the invention relates to seismic data acquisition systems comprising a cabled network connected to a central processing unit, for example onboard a vehicle. The invention particularly relates to the seismic prospecting method for oil industry, but may be applied to any field implementing a seismic data acquisition network. However, one particular application of the invention relates to land seismic data acquisition systems.

2. Background of the Invention

Seismic data acquisition operations in the field conventionally use networks of electronic units whereto ground movement sensors are connected.

These sensors, generally referred to using the term geophones, are generally interconnected in groups of sensors by cables to form clusters referred to as "strings". One or a plurality of these strings are connected to said electronic units. The electronic units, interconnected by a cabled digital network, perform the analogue to digital conversion of the signal from the groups of sensors and send these data to the recording truck via said digital network, a central data processing unit being onboard the truck.

Novel systems have recently been introduced on the market wherein the sensors are integrated in the electronic conversion unit, which eliminates the geophone strings. In this case, the sensors are micro-machined accelerometers.

To collect the geophysical data, one or a plurality of seismic sources in contact with the ground are activated to propagate omnidirectional seismic wave trains. The sources may among other things consist of explosives, falling weights, vibrators or air guns in marine environments.

The wave trains reflected by the layers of the subsurface are detected by the sensors, which generate an analogue signal characterising the reflection of the waves on the geological interfaces of the subsurface.

SUMMARY OF THE INVENTION

The invention particularly applies to seismic data acquisition system implementing a cabled network.

In this type of network, the data are conventionally sent from the digital unit to the central processing unit via intermediate electronic modules.

These intermediate electronic modules perform different functions, including:
- power supply of the units via batteries;
- synchronisation of the units;
- processing of the signal and the interface with the digital network (transfer of data to the central processing unit, sending of commands received from the central processing unit to the units).

In the current cabled systems, the central processing unit sends a synchronisation message to the entire network, this message being repeated by the electronic modules to the units.

For example, the central processing unit may contain a high-precision clock (such as a quartz oscillator), the modules and units optionally being frequency-dependent by means of a phase lock loop (PLL).

The major problem of this type of network is the sensitivity of the system to cable cuts.

In the case of a cabled network, a cable cut causes a loss of connection with the units situated after the cut and therefore the loss of all the seismic measurement points corresponding to these units.

Indeed, the electronic units and modules are devised to only perform signal processing functions. In other words, the electronic units and modules progressively return the seismic data to the central processing unit.

Therefore, a cable cut results in the irremediable loss of the seismic data corresponding to the sensors of the network section isolated by the cut.

These cuts may have various causes:
- passages of animals (rodents, crocodiles, ruminants, etc.);
- vandalism;
- passage of vehicle wheels;
- etc.

It is understood that a cable cut also results in a loss of the synchronisation of the modules on the central processing unit; as the seismic signals can no longer be time-stamped and are thus of no use for the end user.

Furthermore, a seismic data acquisition campaign is performed such that the data are collected for all the points of the rolled out network. If data do not reach the central processing unit for some points, the data collected for the other points provide a lower quality "seismic image". As a result, a cable cut tending to only isolate some points of the network impacts the completion of the acquisition campaign on the entire network, possibly causing the stoppage thereof.

Also, when a cable cut occurs, in practice, an attempt is made to detect and locate the cut without delay so as to be able to remedy same. This is not always easy depending on the terrains whereon the network is rolled out (some campaigns may be performed in mountainous regions, tropical forests, etc.).

With respect to power supply, it is noted that powering units in a unidirectional or bidirectional manner via modules is known.

The advantage of powering the units in a unidirectional manner is the simplicity of the implementation thereof: the voltage is propagated from the central processing unit to the modules followed by the units, followed by the following modules, etc. The drawback of this implementation is that a cable cut implies a shutdown of the power supply of the units situated after the cut to the next module.

On the other hand, a bidirectional power supply enables power supply redundancy: a power outage in one direction may be compensated by power supply continuity from the adjacent module.

To overcome the problem of cable cuts and the effects thereof, it has been proposed to organise the acquisition network in acquisition lines connected to the central processing unit by a main (cabled) communication line but also interconnected by secondary (also cabled) communication means forming a kind of mesh forming alternative paths in the event of a cable cut. However, this solution does not remedy all cable cut scenarios and tends to increase network installation times and costs considerably.

Replacing the cabled unit interconnection network by a radio network has also been proposed by the prior art, so that the end system is a sensor system without any connection cable.

However, this solution proves to be very dissuasive in technical and economical terms due to the very high throughput of data to be processed, requiring complex and very costly suitable equipment.

Furthermore, some terrains are not suitable for satisfactory radio communication, rendering the implementation of such a solution impossible.

The aim of the invention is particularly that of remedying the drawbacks of the prior art.

More specifically, the aim of the invention is that of proposing a seismic data acquisition system comprising a cabled network connected to a central processing unit which remains operational in the event of a cable cut.

A further aim of the invention is that of providing such a system enabling easy control, using the central processing unit, of the sections isolated by a cable cut.

These aims and further aims which will emerge hereinafter are achieved using a seismic data acquisition system comprising:

a central processing unit;
a cabled network connected to said central processing unit comprising a plurality of acquisition lines each comprising:
electronic units assembled in series along a telemetry cable and each associated with at least one seismic sensor, said units processing signals transmitted by said sensor(s);
intermediate modules assembled in series along said telemetry cable and each associated with at least one of said electronic units, each intermediate module providing power supply and synchronisation of said electronic unit(s) wherewith it is associated.

According to the invention, each electronic unit is associated with at least two intermediate modules including at least one upstream and at least one downstream from said electronic unit along said telemetry cable, each intermediate module comprising:

autonomous synchronisation means independent from said central processing unit;
bidirectional and autonomous power supply means so as to power at least one unit upstream from said intermediate module and/or at least one unit downstream from said intermediate module;
means for storing said signals processed by said electronic units, said storage means being bidirectional so as to store the signals from at least one unit upstream from said intermediate module and/or at least one unit downstream from said intermediate module or the other of said two modules.

In this way, by means of the invention, the data acquisition network remains operational in the event of a cable cut.

Indeed, following a cable cut, the operation of the section of cable isolated from the central processing unit continues by means of:

the synchronisation performed by the isolated modules, which is autonomous and independent from the central processing unit;
the power supply of the units supplied by each of the modules;
local storage, on each of the modules, of the seismic data.

Furthermore, in a normal operating situation, the units are associated, by default, along the telemetry cable, with a predefined module, adjacent to the unit (particularly with respect to data storage and synchronisation): the module (n−1) is associated with the unit(s) (n−1), the module (n) is associated with the unit(s) (n), the module (n+1) is associated with the unit(s) (n+1), etc.

However, in the event of a cable cut, a unit n may be isolated from the associated module n.

The invention also makes it possible to remedy this situation: the bidirectional power supply means and the bidirectional storage means of each of the modules make it possible to connect the unit(s) (n) (isolated from the module (n) thereof) to the module (n+1), or the module (n−1) according to the position of the cut.

Preferentially, said synchronisation means are bidirectional so as to synchronise at least one unit upstream from said intermediate module and/or at least one unit downstream from said intermediate module.

Advantageously, each unit comprises means for detecting a link with an intermediate module positioned upstream or downstream from said unit. In this case, said detection means are preferentially associated with the storage means of two intermediate modules.

The unit(s) of an isolated section may thus be automatically connected with a different module to that wherewith they are associated by default, or kept connected with the module wherewith they are associated by default, according to the position of the cut in relation to the modules and units in question.

Preferentially, said synchronisation means comprise a satellite global positioning system integrated in each intermediate module.

According to one advantageous solution, said synchronisation means of said modules are configured to be able to communicate with each other.

In this way, if the GPS of the synchronisation means of one module is defective, or if the GPS of the synchronisation means of one module loses the satellite link, the corresponding module may be synchronised via the synchronisation means of an adjacent module.

Advantageously, the system comprises secondary communication means between said modules and said central processing unit. In this case, said secondary communication means are radio means.

In the presence of secondary communication means, said modules advantageously comprise:

means for indicating the remaining level of autonomy of the power supply means;
means for indicating the storage capacity available.

In this way, an operator can obtain, using the central processing unit and via radio communication with the modules (subject to the terrain), data on the operating status of the modules: remaining battery level, memory available, the operator also optionally performing other functional tests on the modules, whether isolated from the cabled network or not.

According to a further advantageous feature, said intermediate modules comprise connection means to a portable unit independent from the cabled network.

The seismic data stored locally by the modules can thus be retrieved in two modes:

either by the central processing unit, after restoring the communication (replacement or repair of the cut cable);
or by an operator provided with a portable unit, which is moved from module to module to retrieve the data in the portable unit with a view to forwarding same to the central processing unit.

According to a further advantageous solution, said modules comprise means for executing an algorithm for switching said synchronisation means and/or said power supply means and/or said storage means on/off.

It is noted that, in practice, the intermediate modules operate in passive mode, regardless of whether they are in normal operation or in the event of a cut: by default, they power, store and synchronise continuously in a bidirectional manner. As a result, the units are in turn powered and synchronised by default in a bidirectional manner (by two modules, one upstream, the other downstream from a unit in question) and send the data to be stored to the upstream module or to the downstream module depending on the availability of said module; and, in the event of a cut in one direction, a unit is no longer associated with a single module, solely due to the cut in the cabled link.

Furthermore, the algorithm for switching the synchronisation, power supply and storage means on/off is used to stop the campaign in the evening for example and resume same the following morning.

This algorithm is activated by the modules themselves and makes it possible to save power supply and storage means.

According to one particular embodiment, said modules are integrated with the units.

Optimised integration of the functions of the invention is thus obtained on the units, particularly facilitating the storage and rollout of the cabled network.

Other features and advantages of the invention will emerge more clearly on reading the following description of a preferential embodiment of the invention, given as an illustrative and non-limitative example, and the appended figures.

DETAILED DESCRIPTION

As described above, the principle of the invention lies in the association, in a seismic data acquisition system comprising a cabled network connected to a central processing unit, of each electronic unit with two intermediate modules situated on either side of the unit along the cable, and the integration in the modules of autonomous synchronisation means independent from the central processing unit, bidirectional and autonomous power supply means and bidirectional storage means of the signals processed by the units, each intermediate module optionally, according to the status of the cabled link, placing the synchronisation, power supply and storage means thereof at the service of a downstream and/or upstream unit in relation to the module in question.

Figure 1:
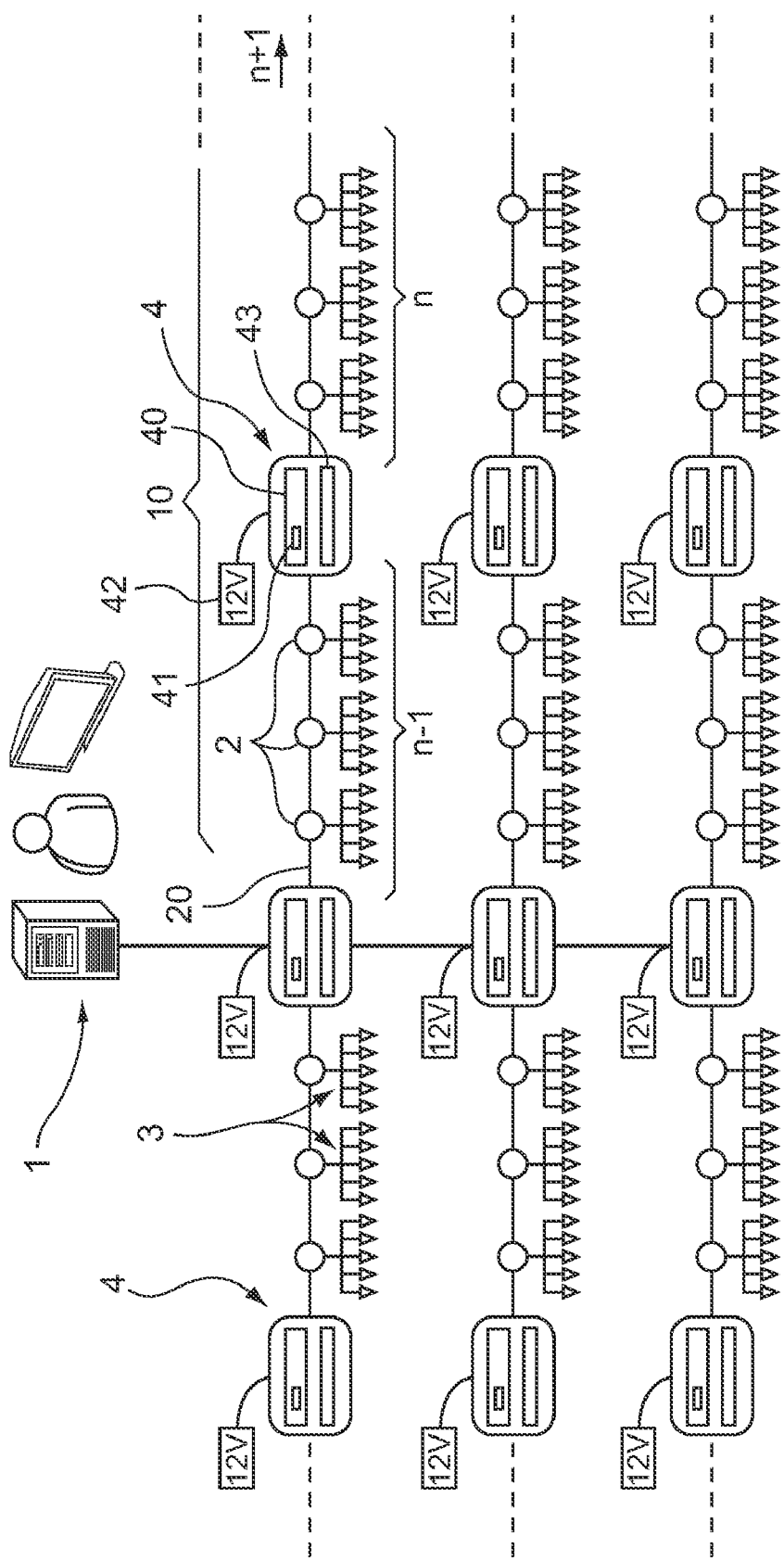
FIG. 1 illustrates schematically a seismic data acquisition system according to the invention, in normal acquisition mode.

With reference to FIG. 1, a seismic data acquisition system according to the invention comprises:
- a central processing unit 1;
- a cabled network connected to said central processing unit 1 comprising a plurality of acquisition lines 10. Each acquisition line 10 comprises:
  electronic units 2 assembled in series along a telemetry cable 20 and each associated with at least one string 3 of seismic sensors (in this instance geophones);
  intermediate modules 4 assembled in series along said telemetry cable 20 and each coupled with one or a plurality of electronic units 2 (three electronic units according to this embodiment).

Conventionally, the units 2 process signals transmitted by the sensors of the strings 3.

It is noted that the invention applies both to single-channel systems (wherein each unit is associated with a single string of geophones or a single accelerometer) and multi-channel systems (wherein each unit is associated with a plurality of strings of geophones or a plurality of accelerometers).

The intermediate modules each comprise:
synchronisation means 40;
electrical power supply means 42, supplying a 12 V voltage for example.

The intermediate modules also perform signal processing and interfacing functions, not shown in FIG. 1, with the digital network (data transfer to the central processing unit, sending of commands received from the central processing unit to the units).

In a normal operation scenario, the units are associated, by default, along the telemetry cable, with a predefined module, adjacent to the unit: the module (n−1) is associated with the unit(s) (n−1), the module (n) is associated with the unit(s) (n), the module (n+1) is associated with the unit(s) (n+1), etc.

Also in a normal operation scenario, the power supply of the electronic units is supplied by each of the intermediate modules, and the intermediate modules n−1, n and n+1 perform the synchronisation of said electronic unit(s) n−1, n and n+1, respectively.

It is noted that, in practice, each unit is supplied continuously with electricity by two intermediate modules (the upstream module and the downstream module in relation to the unit).

Furthermore, the synchronisation of each unit may also be duplicated in normal operation, being carried out continuously by the upstream module and the downstream module in relation to the unit.

According to the principle of the invention, the synchronisation, power supply and storage means of each intermediate module may be used for one or a plurality of electronic units positioned directly downstream (or upstream) from said module but also for one or a plurality of electronic units positioned directly upstream (or directly downstream, respectively) from said module.

For this purpose, the power supply means of each intermediate module are autonomous and bidirectional so as to power either the electronic units positioned directly upstream from said module, or the electronic units positioned directly downstream from said module, or both.

Furthermore, the synchronisation means 40 of each module are autonomous and independent from the central unit, making it possible to continue the synchronisation of all the electronic units, via the modules, even in the event of a cable cut.

According to the present embodiment, the synchronisation means comprise a satellite global positioning system 41 (GPS) integrated in each intermediate module, said modules receiving a synchronisation signal obtained using the GPS thereof or that of an adjacent module (the synchronisation of the electronic units n optionally being performed by the synchronisation means of the intermediate module n−1 (or n+1) in the event of the failure of the GPS of the module n, even in the absence of a cable cut).

According to the principle of the invention, each intermediate module further comprises storage means 43 of the signals processed by said electronic units.

The storage means 43 of each module are associated, by default, with one or a plurality of electronic units positioned downstream (or upstream) from said module, said storage means optionally performing the storage of signals supplied by the adjacent electronic unit(s) positioned directly upstream (or directly downstream respectively) from said module.

For this purpose, the storage means of each intermediate module are bidirectional so as to store the signals supplied either by the electronic units positioned directly upstream from said module, or by the electronic units positioned directly downstream from said module. In other words, the storage means of each module are connected to at least two electronic units including at least one upstream and/or at least one downstream from said intermediate module along said telemetry cable.

Furthermore, each electronic unit comprises means for detecting a link with an intermediate module positioned upstream or downstream from said unit, said detection means being associated with the storage means of two intermediate modules (one directly downstream and the other directly upstream from the corresponding unit).

The detection means comprise means for executing a dialog between the unit and the two modules upstream and downstream from the unit: the unit sends signals to both modules which each return a signal via the cable to the unit; signal return from the modules results in a detection of the cabled link with the corresponding module. Conversely, the lack of signal return from a module indicates a cable cut between the unit and the corresponding module, with the unit in this case sending the data from the sensor(s) to the module whereto it is still connected by the cable (particularly so that the data is stored by the storage means of the connected module).

Figure 2:
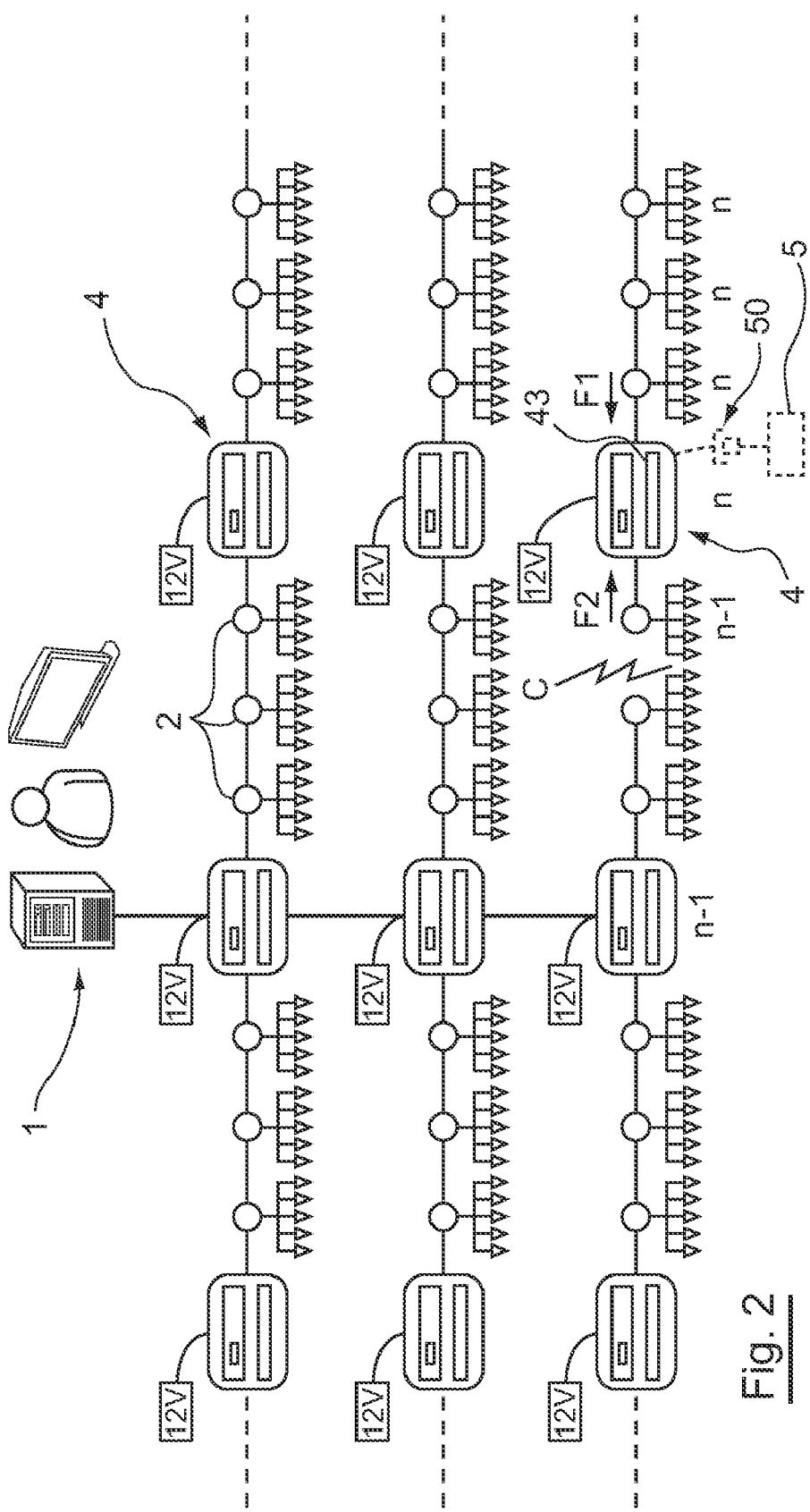
FIG. 2 illustrates schematically a seismic data acquisition system according to the invention, wherein a network section is isolated by a cable cut.

In this way, in the event of a cable cut C positioned between two units n−1 as illustrated by FIG. 2, one of the units n−1 is isolated from the associated unit n−1. The detection means associated with the corresponding unit n−1 return to said unit a signal indicating that it is no longer connected to the intermediate module n−1, a link between said "isolated" unit n−1 and the intermediate module n being established such that:
  the intermediate module n provides the electrical power supply of the "isolated" unit n−1, in addition to providing the electrical power supply to the units n wherewith the module n is associated by default;
  the signals processed by the "isolated" unit n−1 are stored by the storage means 43 of the module n as represented by the arrow F2 (which further stores the signals processed by the units n as represented by the arrow F1);
  the intermediate module n synchronises the "isolated" unit n−1, in addition to synchronising the units n wherewith the module n is associated by default.

Furthermore, the modules comprise means for executing an algorithm for switching said synchronisation means and/or said electrical power supply means and/or said storage means on/off.

The intermediate modules automatically execute the algorithm for switching off (for example in the evening) and switching on (for example in the morning), for example at predefined times.

Since the synchronisation means of the modules are autonomous and independent from the central processing unit, they continuously act on the units wherewith the modules are associated by default. According to the position of the cut, the synchronisation means of a module will optionally synchronise additional units.

The download to the central processing unit 1 of the data stored by the modules downstream from a cut C is performed either via the telemetry cable once same has been repaired or replaced, or via a portable unit 5 carried by an operator and linked (the link may be of any type, cabled or wireless, known to those skilled in the art) with the modules (the operator transporting the portable unit along the entire portion of telemetry cable situated downstream from the cut) via connection means 50.

According to a further aspect of the invention, the modules comprise:
  means for indicating the remaining level of autonomy of the power supply means;
  means for indicating the storage capacity available.

Figure 3:
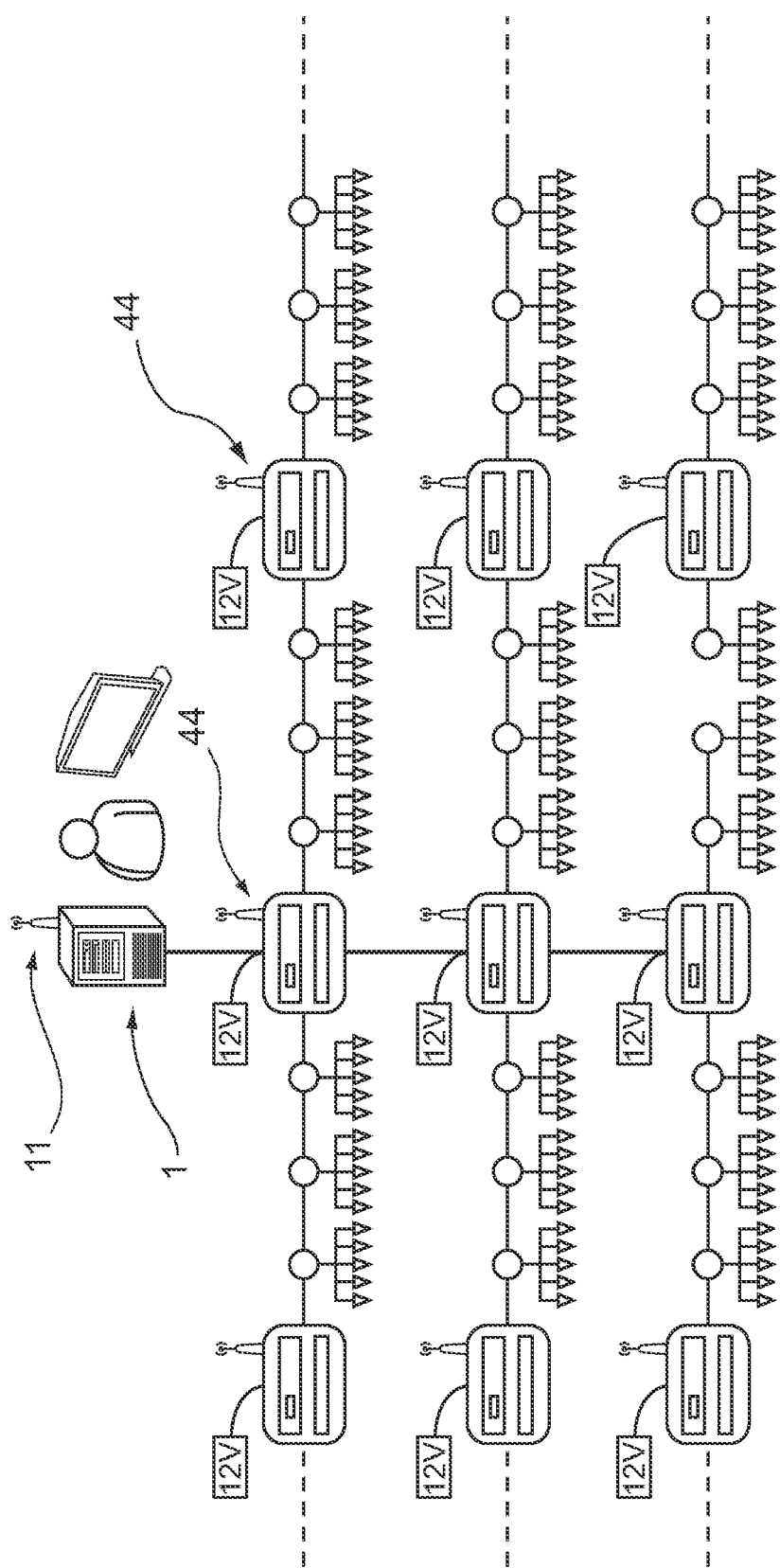
FIG. 3 illustrates a particular embodiment of the invention whereby the modules integrate secondary communication means.

The corresponding data (power supply means autonomy level and storage capacity available) may be transmitted to the central processing unit 1, either at a predefined frequency or at the request of the central processing unit. For this, with reference to the embodiment illustrated in FIG. 3, the central processing unit comprises radio transmission/reception means 11 and the intermediate modules comprise radio transmission/reception means 44, the radio transmission/reception means of the central processing unit and the radio transmission/reception means of the modules being intended to communicate with each other.

Figure 4:
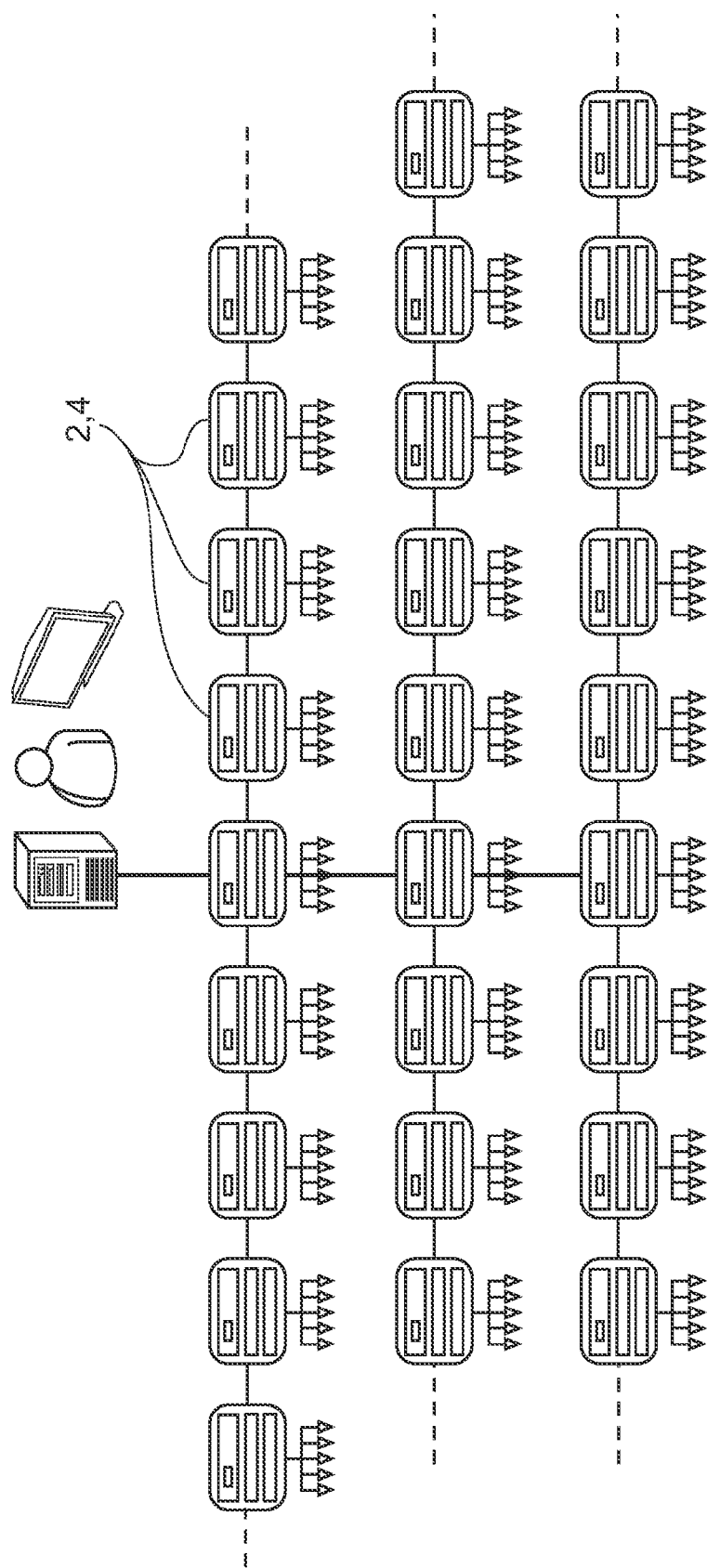
FIG. 4 illustrates a further particular embodiment of the invention whereby the modules are integrated in the electronic units.

It is noted that, according to the particular embodiment illustrated in FIG. 4, an intermediate module as described above is integrated with each electronic unit, to form a single component 2, 4.

In this type of configuration, it is noted that the power supply means may also be integrated directly in the modules.

The invention claimed is:

1. A seismic data acquisition system comprising:
  a central processing unit;
  a cabled network connected to said central processing unit comprising a plurality of acquisition lines each comprising:
  electronic units assembled in series along a telemetry cable and each associated with at least one seismic sensor, said units processing signals transmitted by said sensor(s);
  intermediate modules assembled in series along said telemetry cable and each associated with at least one of said electronic units, each intermediate module providing power supply and synchronisation to said electronic unit(s) wherewith it is associated;
  wherein each electronic unit is associated with at least two intermediate modules including at least one upstream and at least one downstream from said electronic unit along said telemetry cable, each intermediate module comprising:
  autonomous synchronisation means independent from said central processing unit;
  bidirectional and autonomous power supply means so as to power at least one unit upstream from said intermediate module and/or at least one unit downstream from said intermediate module; and
  means for storing said signals processed by said electronic units, said storage means being bidirectional so as to store the signals from at least one unit upstream from said intermediate module and/or at least one unit downstream from said intermediate module.

2. The seismic data acquisition system according to claim 1, wherein said synchronisation means are bidirectional so as to synchronise at least one unit upstream from said intermediate module and/or at least one unit downstream from said intermediate module.

3. The seismic data acquisition system according to claim 1, wherein each unit comprises means for detecting a link with an intermediate module positioned upstream or downstream from said unit.

4. The seismic data acquisition system according to claim 3, wherein said detection means are coupled associated with said power supply means and the storage means of two intermediate modules.

5. The seismic data acquisition system according to claim 1, wherein said synchronisation means comprise a satellite global positioning system integrated in each intermediate module.

6. The seismic data acquisition system according to claim 1, wherein said synchronisation means of said modules are configured to be able to communicate with each other.

7. The seismic data acquisition system according to claim 1, it wherein said system comprises secondary communication means between said modules and said central processing unit.

8. The seismic data acquisition system according to claim 7, wherein said secondary communication means are radio means.

9. The seismic data acquisition system according to claim 7, wherein said modules comprise:
  means for indicating the remaining level of autonomy of the power supply means; and
  means for indicating the storage capacity available.

10. The seismic data acquisition system according to claim 1, wherein said intermediate modules comprise connection means to a portable unit independent from the cabled network.

11. The seismic data acquisition system according to claim 1, wherein said modules comprise means for executing an algorithm for switching said synchronisation means and/or said power supply means and/or said storage means on/off.

\* \* \* \* \*